United States Patent
Trishaun

(10) Patent No.: US 10,102,492 B1
(45) Date of Patent: Oct. 16, 2018

(54) SMART ASSET TRACKING TAG SYSTEM AND METHOD

(71) Applicant: Marquette Trishaun, Orlando, FL (US)

(72) Inventor: Marquette Trishaun, Orlando, FL (US)

( * ) Notice: Subject to any disclaimer, the term of this patent is extended or adjusted under 35 U.S.C. 154(b) by 0 days.

(21) Appl. No.: 15/649,858

(22) Filed: Jul. 14, 2017

Related U.S. Application Data

(60) Provisional application No. 62/363,272, filed on Jul. 17, 2016.

(51) Int. Cl.
| | |
|---|---|
| *G06K 7/10* | (2006.01) |
| *H01Q 1/22* | (2006.01) |
| *G06Q 10/08* | (2012.01) |
| *G08B 13/24* | (2006.01) |
| *H01Q 21/28* | (2006.01) |
| *H04L 29/06* | (2006.01) |

(52) U.S. Cl.
CPC ......... *G06Q 10/08* (2013.01); *G06K 7/10336* (2013.01); *G08B 13/2417* (2013.01); *H01Q 1/2216* (2013.01); *H01Q 21/28* (2013.01); *H04L 63/12* (2013.01)

(58) Field of Classification Search
CPC ..... G06Q 10/0833; G01S 19/34; G01S 19/16; G01S 5/0289; G01S 5/10; G08B 13/2462; G08B 21/02; G08B 29/046; H05B 37/0272; G05B 19/048; H04W 4/029
See application file for complete search history.

(56) References Cited

U.S. PATENT DOCUMENTS

| | | | |
|---|---|---|---|
| 6,512,478 B1* | 1/2003 | Chien ................... | G01S 5/0215 340/572.1 |
| 6,553,336 B1* | 4/2003 | Johnson ................ | G01D 3/022 702/188 |
| 7,133,800 B2* | 11/2006 | Delin ..................... | G01D 21/00 702/125 |
| 9,392,417 B1* | 7/2016 | Venkatraman ........ | H04W 4/001 |
| 2008/0158391 A1* | 7/2008 | Suzuki ................... | H04N 5/772 348/231.99 |
| 2012/0112536 A1* | 5/2012 | Karalis ................. | B60L 11/182 307/10.1 |

(Continued)

*Primary Examiner* — Fekadeselassie Girma
(74) *Attorney, Agent, or Firm* — Brian S. Steinberger; Law Offices of Brian S. Steinberger, P.A.

(57) ABSTRACT

Systems, devices, and methods for a smart asset tag solution for tracking assets along the distribution cycle. These solutions are an extension of using various radio frequency technologies to locate the whereabouts of goods/assets with the use of additional sensors to provide granular knowledge about the asset above and beyond location. The technology seeks to differentiate when the asset is being transported, stationary, or other inspection points along the distribution cycle of the cargo. To achieve this goal, a combination of RF sensors/transceivers for the real-time location along with other sensor to include IMUS, proximity sensors, and ambient light and temperature sensors deduce information about the asset over and beyond just the location. The combination of data will be combined to provide a real-time touchpoint for cloud based tracking above and beyond the current state-of-the-art in internet-of-things asset tracking.

16 Claims, 8 Drawing Sheets

(56) References Cited

U.S. PATENT DOCUMENTS

| | | | |
|---|---|---|---|
| 2012/0161958 A1* | 6/2012 | Turon | G01S 19/34 340/539.3 |
| 2012/0223573 A1* | 9/2012 | Schatz | H02J 5/005 307/9.1 |
| 2012/0235501 A1* | 9/2012 | Kesler | H03H 7/40 307/104 |
| 2012/0235634 A1* | 9/2012 | Hall | H03H 7/40 320/108 |
| 2015/0054413 A1* | 2/2015 | Chen | H05B 37/0281 315/155 |
| 2015/0213709 A1* | 7/2015 | Miller | H02J 7/35 340/693.2 |
| 2015/0236546 A1* | 8/2015 | Kesler | H04B 5/0037 455/573 |
| 2015/0255994 A1* | 9/2015 | Kesler | H02J 5/005 307/10.1 |
| 2015/0371511 A1* | 12/2015 | Miller | G01S 19/16 340/545.6 |
| 2015/0373487 A1* | 12/2015 | Miller | H04W 4/02 455/456.1 |
| 2016/0234034 A1* | 8/2016 | Mahar | H04L 12/282 |
| 2017/0245347 A1* | 8/2017 | Zhou | H05B 37/0227 |
| 2017/0254555 A1* | 9/2017 | Tae | F24F 11/0012 |
| 2017/0269220 A1* | 9/2017 | Turon | G01S 19/34 |
| 2017/0345270 A1* | 11/2017 | Singh | G08B 21/02 |

* cited by examiner

SMART ASSET TRACKING TAG SYSTEM AND METHOD

CROSS REFERENCE TO RELATED APPLICATIONS

This application claims the benefit of priority to U.S. Provisional Application Ser. No. 62/363,272 filed Jul. 17, 2016, the entire disclosure of which is incorporated herein by specific reference thereto.

FIELD OF INVENTION

This invention relates to smart asset sensors, and in particular to devices, systems for the tracking of assets along a supply chain logistics transport cycle which extends the use of radio frequency technologies to locate the whereabouts of goods/assets, with the use of additional sensors to provide granular knowledge about the asset above and beyond location. The technology seeks to differentiate when the asset is being transported, stationary, or other inspection points along the transport cycle of the tracked asset. To achieve this goal, a combination of RF sensors/transceivers for the real-time location along with other sensors to include IMUs, proximity sensors, ambient light, and temperature sensors deduce information about the environment surrounding the asset. The combination of said data is combined to provide predicative analytics for cloud based tracking that can further aid in data mining applications where suppliers seek to improve efficiency in supply chain logistics.

BACKGROUND AND PRIOR ART

Almost without exception, most active tags monitor overall movement using a GPS assisted radios with no priori to energy conservation when the tag is indoors or other stationary situations where the tag is not currently deployed with assets in tow. While passive tags are not susceptible to the constant energy draw, they are not capable of maintaining active records of the events for the duration of the whole trip due to limitations of energy that can be stored on the tag. This limits their effectiveness where real-time alerts are desired.

Accordingly, there is a need for an asset tag that can conserve energy when not in use like the inherent nature of the passive RFID tag but when active provide the ability for real-time retrieval of actionable data where assets are being tracked during the transport cycle where a number of environmental conditions can adversely alter or affect the items while in tow.

Thus, the need exists for solutions to the above problems with the prior art.

SUMMARY OF THE INVENTION

A primary objective of the invention is to provide an active asset tag with multiple input sensors to provide the tag a sense of situational awareness to switch context from storing, transmitting, and conserving energy in the proper context for prolonged deployment in the supply chain.

The sensor can be designed in such a fashion to allow for multiple embodiments where the sensor can be attached as standalone to a single end item (i.e. sensitive luggage) or concealed within the framework of cargo, containers, and other supply transport mechanisms.

This sensor shall contain a proximity sensor with the addition of an inertial measurement unit/displacement sensor to detect if something is approaching or moving away from the tracked asset. Said sensor can also be used to assert regulatory processes with how fast and how much impact a tracked asset can withstand during mounting and dismounting during any transport.

This sensor includes multiple radio protocols in different radio bands for broadcasting a distress beacon tuned within the bandwidth of first responder's radios to alert the said responder to the distressed asset within their sphere of patrol/coverage. WI-FI is an example of a modern radio protocol that can provide information about whereabouts using MAC address if the missing asset is within the range of a broadcasting WI-FI LAN from a home, or business nearby.

This sensor can include an RF transponder to assist with person assisted location efforts where the partnered responder shall have a custom designed homing device capable of remote control access for collocation on a UAV type system for broad scans of a remote area. The said mode is also intended to provide a means to locate the distressed assets when all other onboard energy sources are completely discharged.

The electronic card assembly shall comprise both the circuit card, and a hybrid battery solution that relies on both a solid state battery and energy-harvesting style mechanisms to maintain the minimal operation point of the sensor. An example of such technology is the kinetic motion used to power wrist watches. The sensor shall contain a high energy cell that shall be activated via electro mechanical switch, and is intended as one-time high-energy-density power source (i.e. lithium battery) for the transmit tower level broadcasting of the distress beacon when the sensors normal battery is at a critical level.

The sensor will charge by air on a day-to-day basis during normal operation without requiring removal of the battery supply. The sensor shall also contain provisions for solar cell operation where exposure to sunlight is available per the specified embodiment.

The sensor software suite running on the host mobile device/personal computer shall pinpoint the exact location of the tracked asset using a leading mapping application (i.e. Google Maps etc.). The sensor data shall be reported to the cloud for predicative analytics on a granular level about the overall health and anticipation of the protected asset.

The wireless link shall support the Bluetooth, UHF/VHF and LTE communication protocol. The chosen antenna and RF substrate are fully compatible with all competing lower-power standards/communication radios.

The sensor can be designed/packaged in such a way to conceal its presence on a tracked asset. The sensor shall be capable of being concealed within the individual packaging, on the shipping container, or mechanical transport mechanisms.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1B:
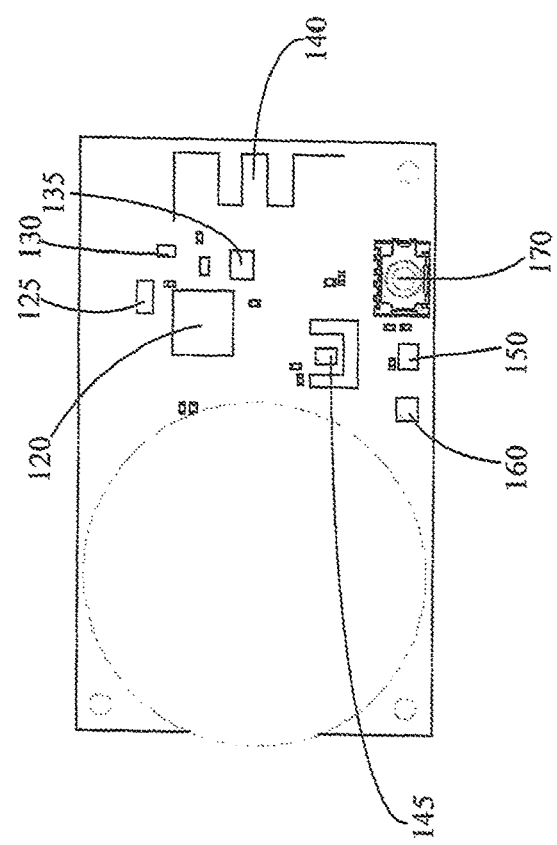
FIG. 1B is a front view of the sensor circuit architecture of FIG. 1A.
Figure 1A:
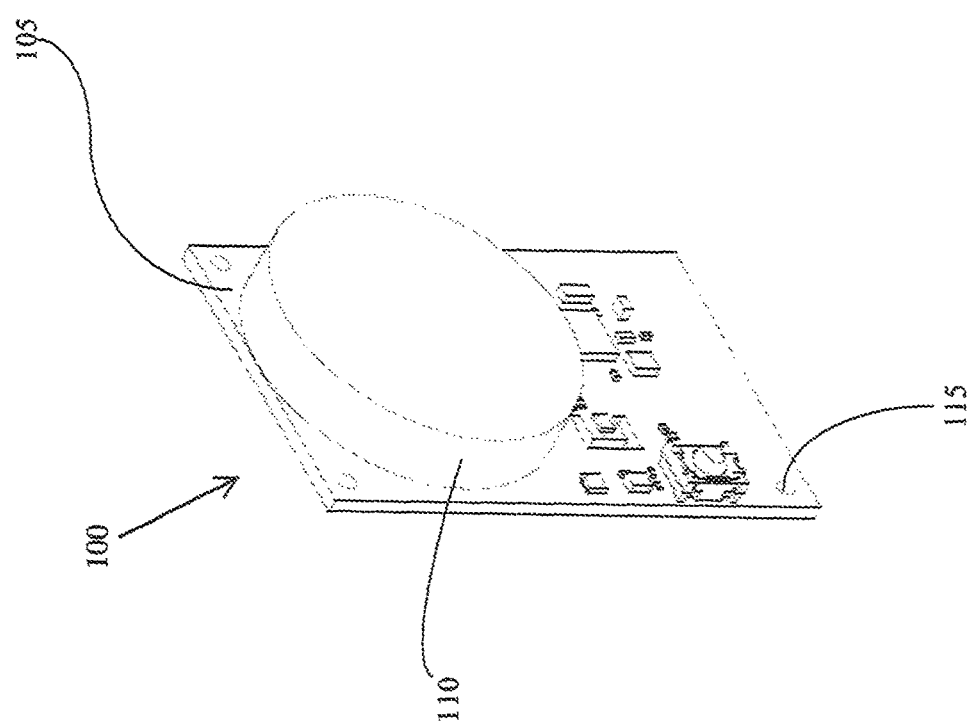
FIG. 1A is a perspective front view of sensor circuit architecture used in the sensor.

FIGS. 1A-1B shows an overview of the sensor circuit architecture 100. In the embodiment shown in this figure, the printed wiring board 105 makes provision for the battery source 110 to be directly coupled to the board to allow for a self-contained solution that is easy to replace the battery. The mounting holes 115 allow for the sensor to take on multiple embodiments where it is desired to conceal within containers and other external enclosures as a subassembly.

At the heart of the sensor is a microprocessor 120 that is responsible for maintaining all housekeeping functions to include monitoring battery voltage, low power radio alerts, along with storing off the snapshots from periphery sensors. The lower power radio systems make use of compact and planar antennae 140 embedded into the printed circuit board.

The periphery sensor include but are not limited to the inertial measurement unit 160 for measuring vibrations and any other motion associated with the sensor. The onboard humidity/temperature sensor 145 measures relative humidity up to a full scale value of 100%. The onboard ambient/UV light sensors 150 allow for the sensor to distinguish between indoor lighting versus outdoor sunlight. This function is useful in not running the GPS radio 135 when the sensor is indoors to conserve the large amounts of energy wasted in an attempt to obtain a futile satellite lock.

The onboard flash unit 120 allows the sensor to store off environmental data for the sensor for total recall of the events regarding the asset during transport. The said sensor also stores off local extremes for the tracking of assets sensitive to environmental changes which can detect if a fleet unit is maintaining proper refrigeration etc. Once the sensors are back at the depot, an IR receiver 170 can be sent a special code to wipe out the units maximum/minimum sensor readings across multiple sensors simultaneously with involving the lower power radio units. This allows for selective wiping of sensors without effecting others if the end user so desires.

Figure 2B:
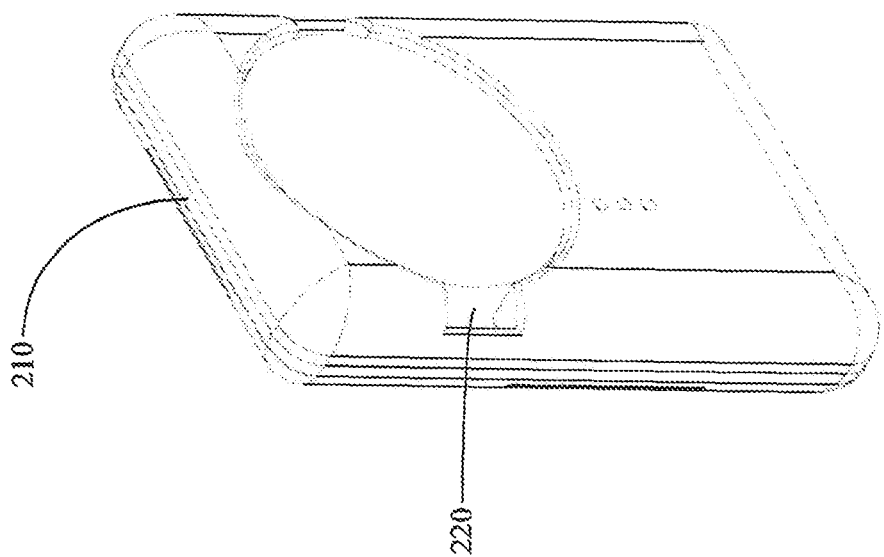
FIG. 2B is a front view of the sensor with standalone enclosure of FIG. 2A upright.
Figure 2A:
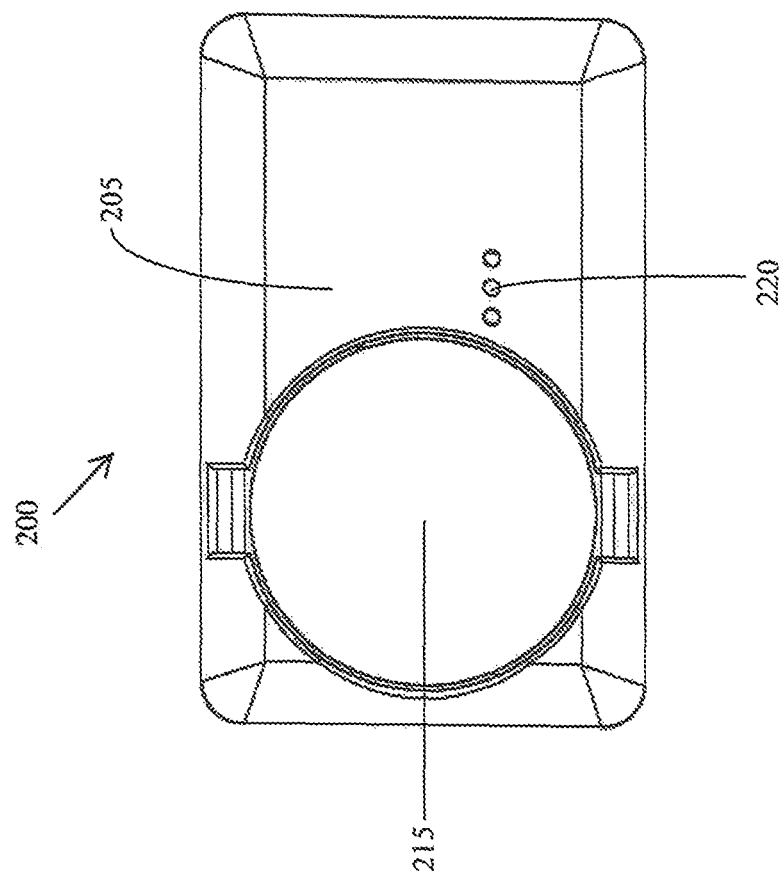
FIG. 2A is a perspective front view of the sensor with standalone enclosure.

FIGS. 2A-2B are illustrations of the tag in a standalone enclosure subassembly 200. The outer enclosure 205 forms a hermetic seal where needed with vent holes 220 that can be patched with Gortex material to allow vapor to pass and still provide accurate humidity readings. The case is streamline 210 for adhesive mounting to packages. The case provides easy access to the battery compartment 220 for quick changing of the battery 215 without dismantling the sensor.

Figure 3:
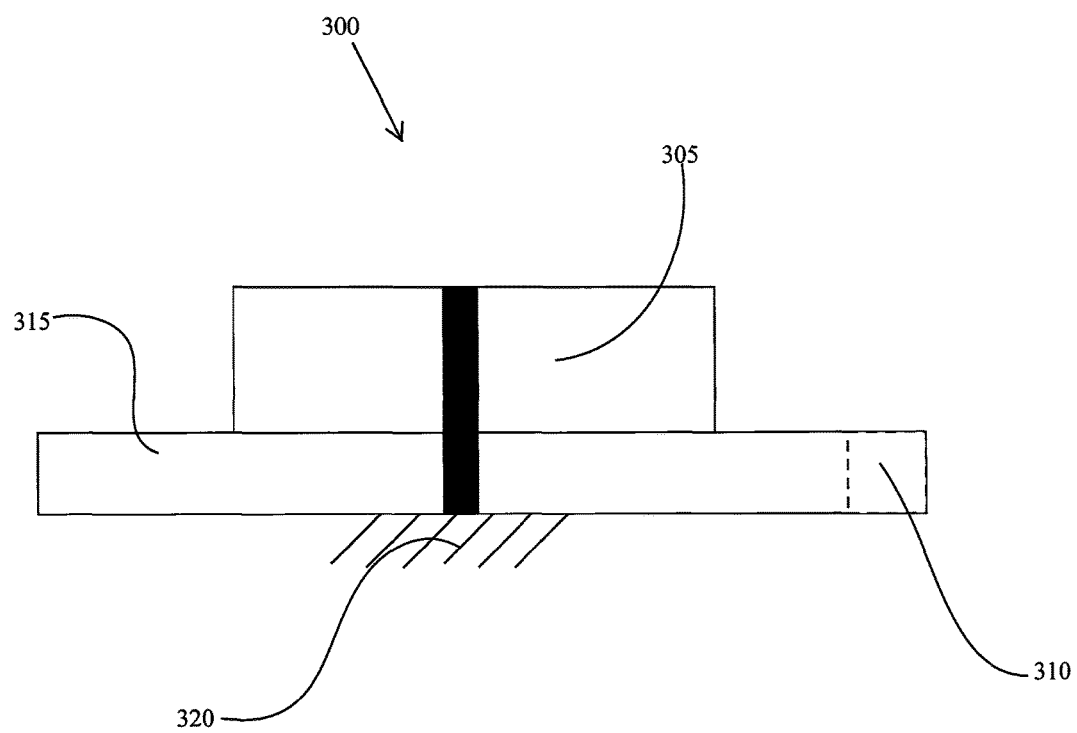
FIG. 3 shows the sensor of the preceding figures on a tracked asset.

FIG. 3 depicts the tag contained within a package 305 while being transported via a pallet. Multiple packages with tags can be picked up and read using another tag in master mode 310 concealed within the pallet. Said pallets can be stacked 320 on top of one another with no adverse effects to the other tags in close proximity.

Figure 4:
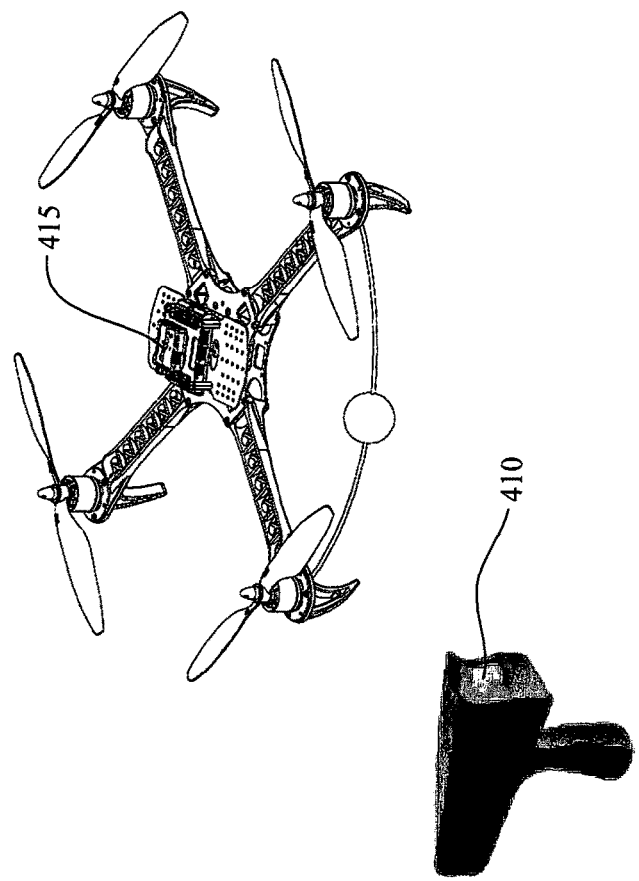
FIG. 4 is an illustration of the operation of the sensor of the preceding figures in RF-Beacon Mode
Figure 4:
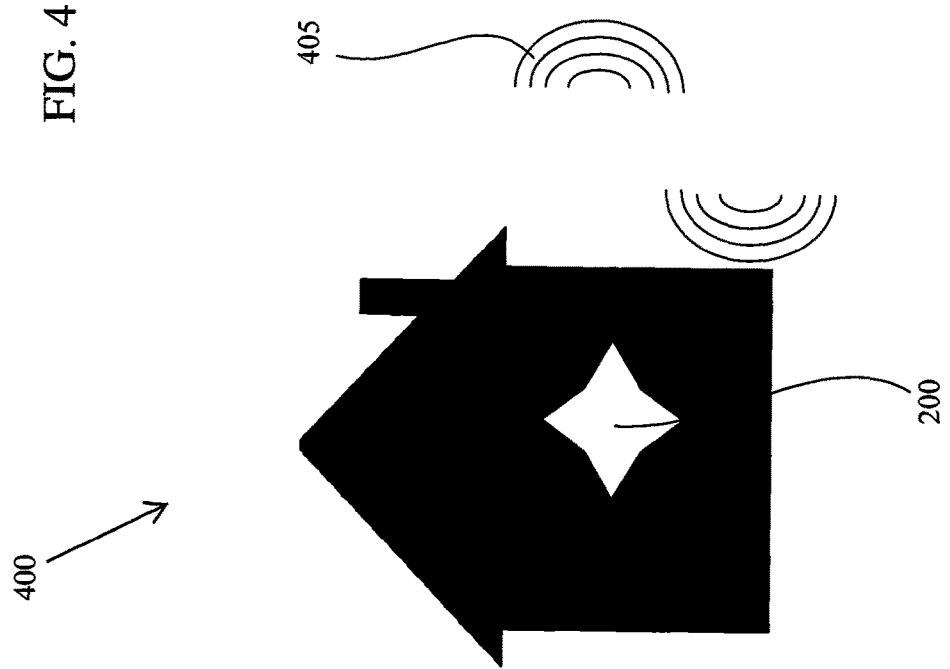

FIG. 4 covers the scenario of a lost tag on a tracked asset 400. Since the tag 200 contains and active radio it can therefore beacon at a user determined polling rate. A dedicated reader 410 can be programmed to scan for these signatures 405 to locate assets within buildings from outside the building. Such reader can be mounted to a drone unit 415 to cover large swaths of land where multi-unit warehouses come into play.

Figure 5B:
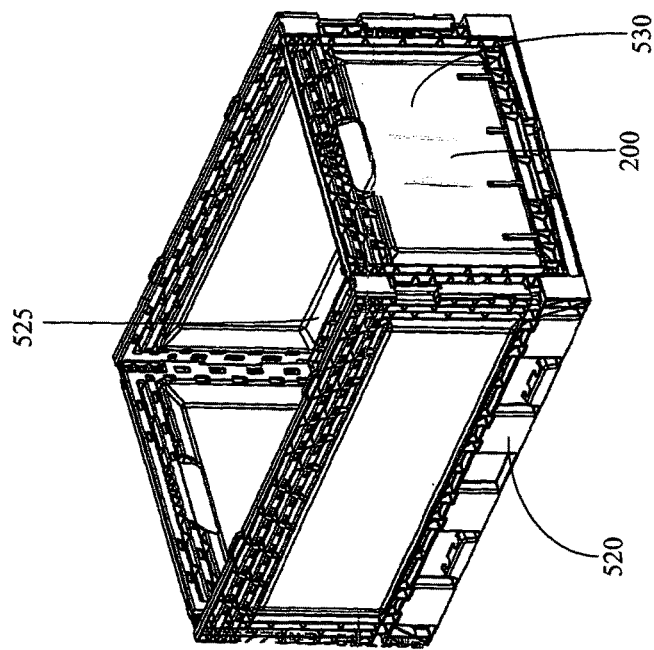
FIG. 5B is a perspective view of the sensor in the container of FIG. 5A in an assembled state.
Figure 5A:
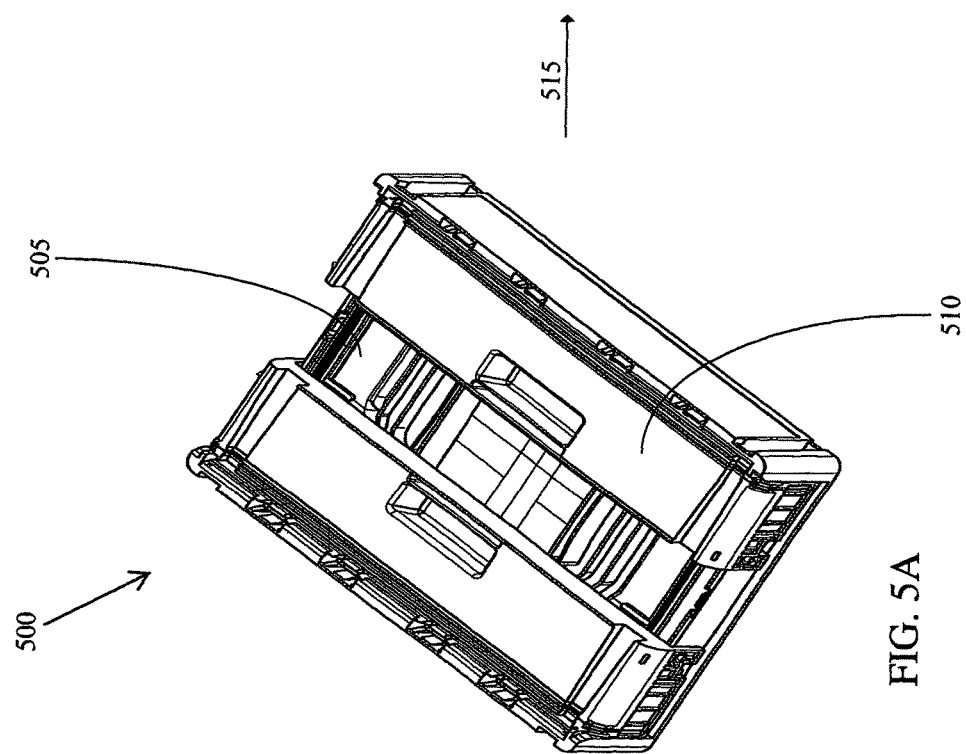
FIG. 5A is a perspective view of the sensor of the preceding figures in a collapsible container that is in a collapsed state.

FIG. 5 is an illustration of sensor in a collapsible container. When in a collapsed state 510, algorithms detect movement and orientation 505 in order to determine if the unit is being readied for transport in upright stationary position 520. As the unit transitions from the collapsed state 515 to being ready for the transport of goods 525, this detected state change triggers various notifications and status updates to signal an appropriate course of actions. When the asset is fully expanded the sensor 200 is in a specific orientation 530 which tracks and alerts to the current state of the asset, an example being whether the asset is being used/filled with goods.

Figure 6:
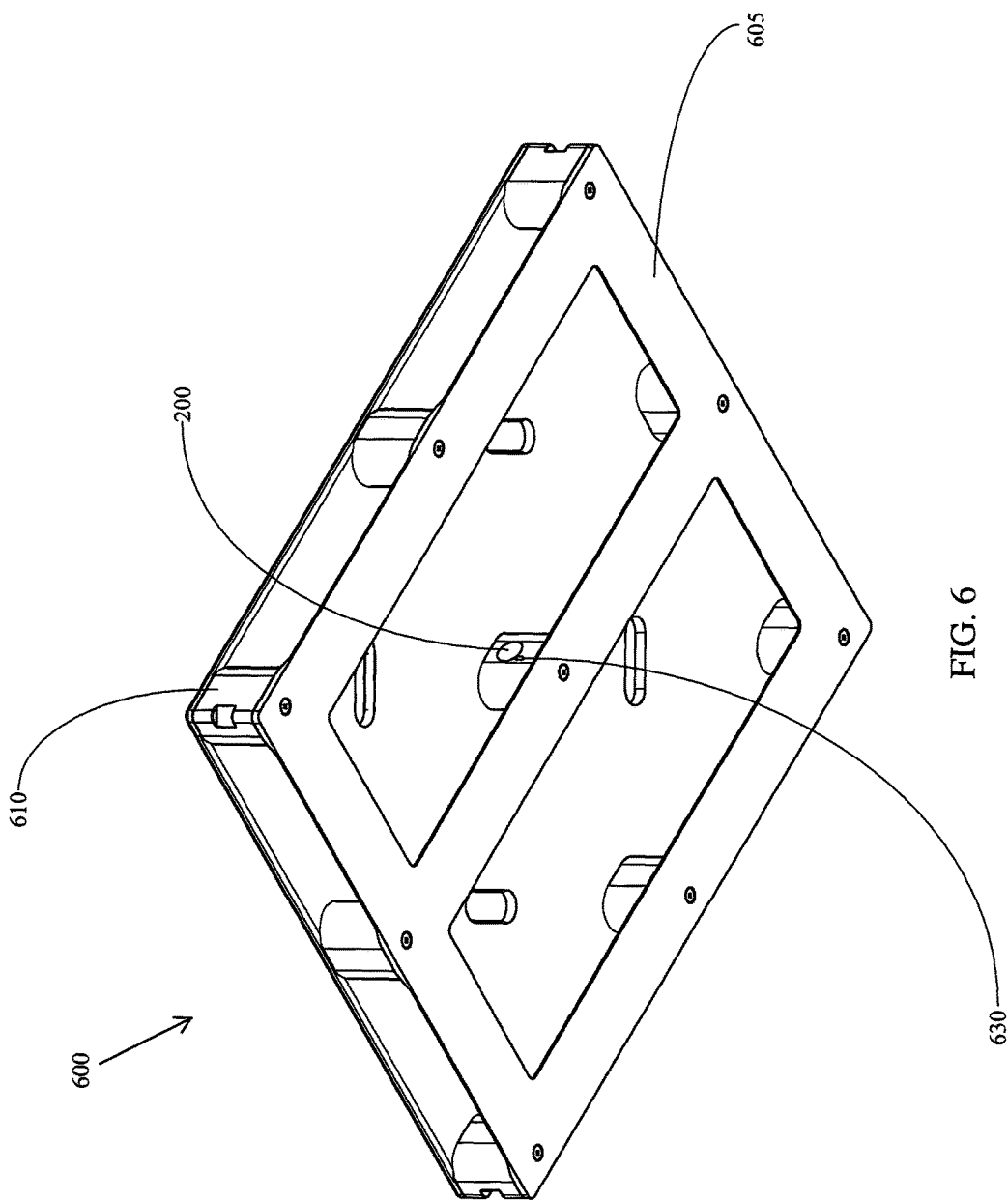
FIG. 6 is a perspective view of the sensor of the preceding figures permanently installed in a pallet.

FIG. 6 is an illustration of the sensor permanently installed in a pallet 605. Although the tag could be installed in one of the many corner blocks 610, in some cases it is desired to conceal the tag in a less conspicuous fashion and target the center block. While maintained in the center block, a simple opening 630 is needed where units are required to track humidity otherwise the tag can be permanently installed and still maintain access to the battery.

Figure 7:
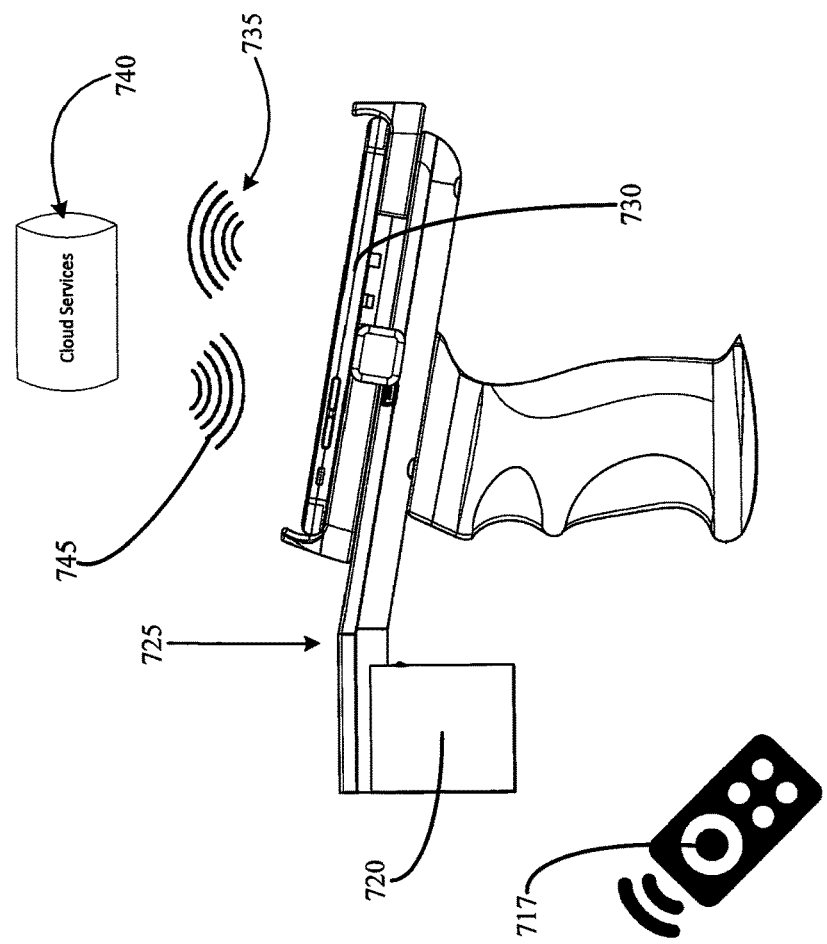
FIG. 7 is an illustration of the sensor of the preceding figures during a logistical operation.
Figure 7:
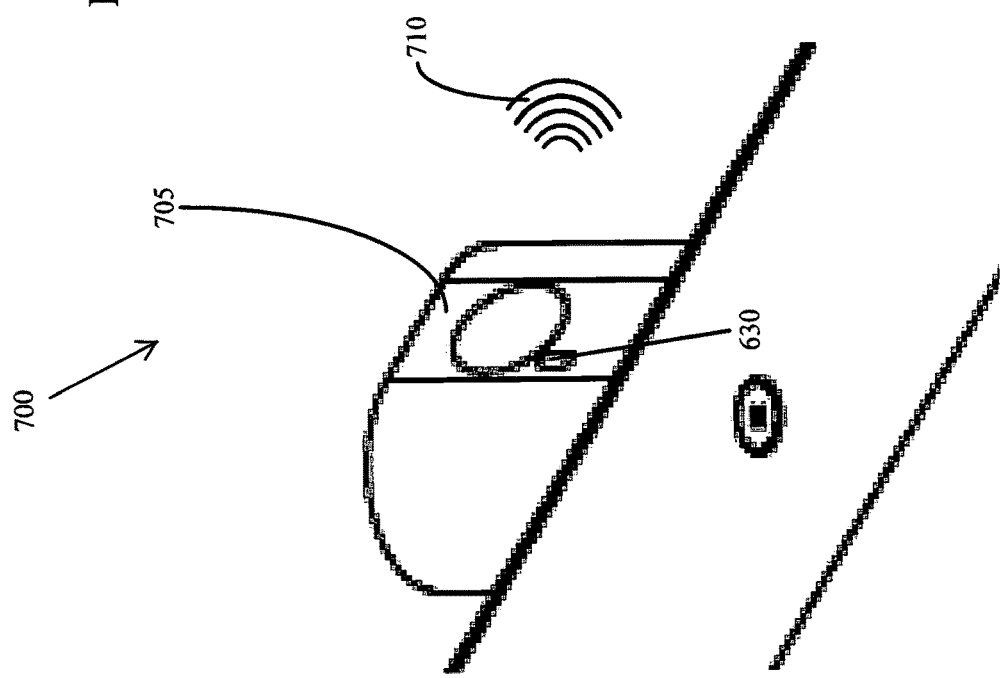

FIG. 7 is an illustration of the sensor during logistical supply chain operation. When the tag enters a warehouse facility 700 it can be immediately picked up by readers in both close and far proximity since the active RF beacon feature 710 insures several meters of range. This eliminates chokepoints and missed reads attributed to passive RFID tags. The reader 720 is paired with software for configuration and data display purposes. The software is not limited to any form of operating system and can exist local or in remote proximity to the reader (i.e. laptop, smartphone) 730.

Sensor data reports are configurable in the software both as to the functionality of the reader and the data retrieved from the tags. Using a cloud database of pertinent data 740 on perishable items for example, said data parameters 745 can be passed down to local reader to corroborate with data collected by the reader from the tag 735) and passed up to this database from the tag such the end user can make real-time decisions about what is permissible norms of the assets received. When all said and done local data can be erased using an IR reader 717 with special codes authorizing such, and the tag is again ready for deployment.

Figure 8:
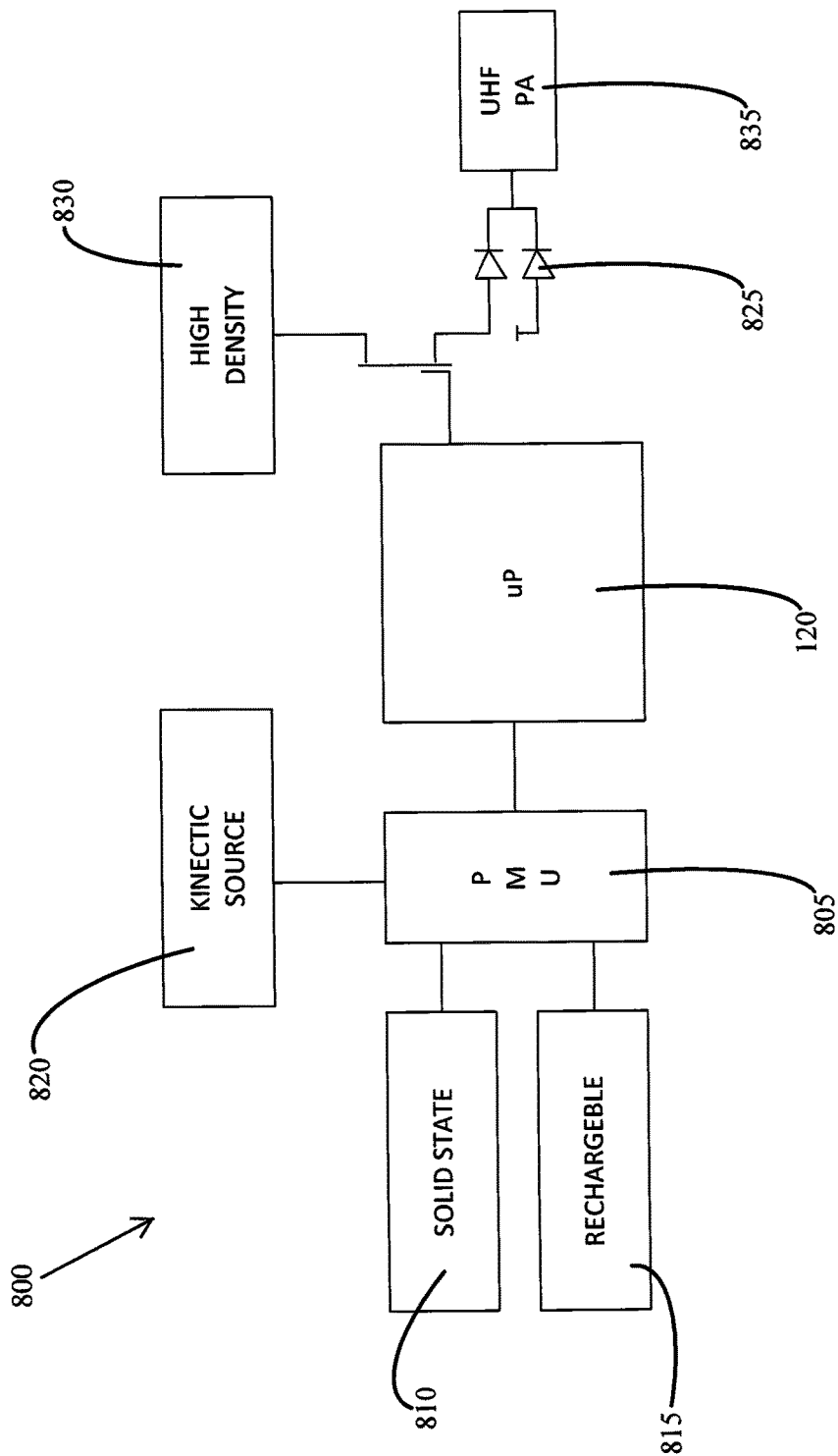
FIG. 8 depicts the hybrid power flow chart scheme for an asset in distress.

Referring to FIG. 8, the onboard power management system 800 shall utilize a hybrid power scheme intended to maximize the life of the sensor during the distress mode. During the normal day-to-day operation of the sensor, only the rechargeable battery 815 will be in use. When the RLS sensor becomes low on power during normal operation, the sensor will send periodic alerts to the host monitoring system (i.e. ADT style security personnel) using a higher powered amplifier 835 to ensure both local and wide area broadcast power distress. The solid-state battery 810 is intended for use with an energy harvesting mechanism to convert natural energy sources (i.e. thermal and solar energy) for ultra-low-rate bursts using the RFID tag in a perpetual beacon mode but can be limited by available power—however any minuet power will still result in a broadcast. Certain embodiments of the sensor will contain a high energy source 830 to broadcast very strongly at maximum power that this is will last time said sensor is alive for broadcast equivalent to burning a flare on distress ship.

It should also be noted that various changes and modifications to the presently preferred embodiments described herein will be apparent to those skilled in the art. Such changes and modifications may be made without departing from the spirit and scope of the present invention and without diminishing its attendant advantages.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A system for tracking of assets, comprising:
    a portable housing for being attached to an asset to be tracked;
    a plurality of sensors mounted in the portable housing, the plurality of sensors includes: a humidity and temperature sensor, a location detection sensor for detecting location of the portable housing in real-time, an indoor/outdoor sensor for distinguishing between indoor lighting and outdoor lighting, and a measurement sensor in the portable housing for measuring movements of the portable housing;
    a transmitter on the portable housing for providing wireless transmissions to remote locations, based on data collected from the humidity and temperature sensor, the location detection sensor, the indoor/outdoor sensor and the measurement sensor;
    a battery power source in the portable housing for supplying power to the humidity and temperature sensor, the location detection sensor, the indoor/outdoor sensor and the measurement sensor; and
    an IR (infra red) receiver in the portable housing for receiving selected code to wipe out maximum and minimum sensor readings from each of the plurality of the sensors in the portable housing.

2. The system of claim 1, wherein the location sensor is a GPS (global position satellite) sensor.

3. The system of claim 1, wherein the measurement sensor measures vibrations.

4. The system of claim 1, wherein the indoor/outdoor sensor is used to shut off the location sensor when the portable housing is located indoors.

5. The system of claim 1, wherein the humidity and temperature sensor detects health of the tracked asset.

6. The system of claim 1, wherein the portable housing includes: an outer sealed enclosure.

7. The system of claim 6, wherein the portable housing further includes:
    vent holes in the housing which are sealed against moisture, and allow vapor to pass therethrough to provide accurate humidity readings.

8. The system of claim 1, wherein the asset includes: a pallet.

9. The system of claim 8, wherein the pallet includes: stacked pallets.

10. The system of claim 1, wherein the portable housing with the plurality of sensors is permanently installed on the pallet.

11. The system of claim 1, wherein the tracked asset includes: a collapsible container.

12. The system of claim 1, wherein the tracked asset includes:
    enclosures to accommodate supply chain storage/shipping equipment.

13. A system for tracking of assets, comprising:
    a portable housing for being attached to an asset to be tracked;
    a plurality of sensors mounted in the portable housing, the plurality of sensors includes: a humidity and temperature sensor, a location detection sensor for detecting location of the portable housing in real-time, an indoor/outdoor sensor for distinguishing between indoor lighting and outdoor lighting, and a measurement sensor in the portable housing for measuring movements of the portable housing;
    a transmitter on the portable housing for providing wireless transmissions to remote locations, based on data collected from the humidity and temperature sensor, the location detection sensor, the indoor/outdoor sensor and the measurement sensor;
    a battery power source in the portable housing for supplying power to the humidity and temperature sensor, the location detection sensor, the indoor/outdoor sensor and the measurement sensor; and
    a receiver in the portable housing for receiving selected code for erasing local data from selective sensors of the plurality of the sensors without effecting other sensors from the plurality of the sensors.

14. The system of claim 13, wherein the receiver further includes the simultaneous wiping of the local data from the selective sensors.

15. A system for tracking of assets, comprising:
a portable housing for being attached to an asset to be tracked;
a plurality of sensors mounted in the portable housing, the plurality of sensors includes: a humidity and temperature sensor, a location detection sensor for detecting location of the portable housing in real-time, an indoor/outdoor sensor for distinguishing between indoor lighting and outdoor lighting, and a measurement sensor in the portable housing for measuring movements of the portable housing;
a transmitter on the portable housing for providing wireless transmissions to remote locations, based on data collected from the humidity and temperature sensor, the location detection sensor, the indoor/outdoor sensor and the measurement sensor;
a battery power source in the portable housing for supplying power to the humidity and temperature sensor, the location detection sensor, the indoor/outdoor sensor and the measurement sensor;
an orientation detector in the portable housing for determining if the system is ready for deployment; and
a receiver in the portable housing for receiving selected code to erase local data from the plurality of the sensors in the portable housing before deployment.

16. The system of claim 15, wherein the receiver further includes erasing the local data from selective sensors.

* * * * *